United States Patent [19]

Kenworthy

[11] 4,436,501

[45] Mar. 13, 1984

[54] APPARATUS FOR MAKING SPECIAL BRICK SHAPES

[75] Inventor: Samuel P. Kenworthy, Southern Pines, N.C.

[73] Assignee: Basic Machinery Co., Inc., Siler City, N.C.

[21] Appl. No.: 401,103

[22] Filed: Jul. 23, 1982

[51] Int. Cl.[3] .............................................. B29C 17/14

[52] U.S. Cl. .................................... 425/308; 264/157; 425/296; 425/301; 425/315

[58] Field of Search ............... 264/145, 146, 148, 157, 264/158; 425/296, 301, 308, 313, 314, 315, 316

[56] References Cited

U.S. PATENT DOCUMENTS

| | | | |
|---|---|---|---|
| 3,461,196 | 8/1969 | Bowles | 264/148 |
| 3,589,495 | 6/1971 | Pearne et al. | 198/379 |
| 4,311,073 | 1/1982 | Brugger et al. | 264/157 |
| 4,342,719 | 8/1982 | Cruse et al. | 264/146 |

*Primary Examiner*—Donald E. Czaja

*Assistant Examiner*—Mary A. Becker

*Attorney, Agent, or Firm*—Pearne, Gordon, Sessions, McCoy, Granger & Tilberry

[57] ABSTRACT

A method and apparatus for producing special brick shapes such as corner brick and arch brick is disclosed. In accordance with the invention, selected slugs are pushed from an off-bearing belt under surface treatment means to an elevator. A cutter box or frame is located above the elevator. Such frame includes cutter means to cut the slugs into a desired shape and surface treatment means for treating the side edges of the slugs. The elevator raises the slugs up through the cutter frame to a position in alignment with the discharge platform. A single pusher assembly operates to push the slugs from the off-bearing belt to the elevator at one elevation and to push the cut slugs from the elevator onto the discharge platform at another elevation. The apparatus operates in conjunction with a conventional setting machine without interfering with the operation thereof.

7 Claims, 8 Drawing Figures

APPARATUS FOR MAKING SPECIAL BRICK SHAPES

BACKGROUND OF THE INVENTION

This invention relates generally to the manufacture of bricklike articles, and more particularly to a novel and improved method and apparatus, for use with a conventional setting machine, capable of automatically producing specially shaped bricks without interrupting the production of conventional brick.

PRIOR ART

U.S. Pat. No. 3,589,495 to Pearne et al. describes a typical setting machine for the automatic production of brick. In such machine, a column of clay is extruded through a die onto an off-bearing belt. A slug cutter cuts the column into slugs which move down the off-bearing belt to subsequent processing operations, which usually include cutting the slug into brick or a cut slug, facing or stacking the slugs, and setting the brick on a kiln car for subsequent drying and firing. Such patent is incorporated herein by reference.

In some setting machines, the slugs are stacked or faced prior to cutting, and in other instances, the slugs are cut prior to the stacking or facing. Such setting machines operate effectively to automatically provide quality brick at high production rates. They are incapable, however, of producing special shapes often required in significant quantities. Consequently, the production of special shapes has in the past normally been done by hand. Such manual or hand production is expensive and uniform high quality is difficult to achieve.

SUMMARY OF THE INVENTION

There are a number of aspects to the present invention. In accordance with one important aspect, a novel and improved method and apparatus are provided for producing special brick shapes, such as brick for arches, corner bricks, and many other desired shapes.

In the illustrated preferred embodiment, the apparatus is arranged to receive slugs from an off-bearing belt of a conventional setting machine. The apparatus functions to remove selective slugs from the off-bearing belt without interfering in any way with the operation of the primary setting machine. Within the apparatus itself, the slug is moved laterally past upper face treatment devices which produce, for example, mortar grooves, texturing, and/or edge rolling.

After such face treatment, the slug is positioned beneath the cutter frame and the slug is raised up through such frame to cut the slug into the required special pieces. During such movement, the opposite vertical side edges of the slug are also given desired surface treatment. Therefore, surface treatment can be provided on at least three surfaces of the article produced.

In accordance with another aspect of this invention, a novel and improved pusher system is provided in which a single pusher assembly pushes the slug off the off-bearing belt of a setting machine or the like and to a cutting position. After cutting, the same pusher assembly pushes the cut slug out of the cutting position and onto a table for subsequent processing.

A removable and replaceable cutter frame also is provided to permit easy and quick changeover from one product to another.

These and other aspects of the invention are illustrated in the drawings, and are more fully described in the following specification.

DETAILED DESCRIPTION OF THE DRAWINGS

In a typical setting machine, elongated slugs having a cross section conforming to the shape of the brick are carried by an off-bearing belt 10 to a location for subsequent processing operation. Such subsequent operation is either the stacking of uncut slugs or the cutting of the slugs into cut slugs consisting of a plurality of abutting brick followed by stacking or facing operations as required.

In setting machines the various operating components are operated by demand type controls. In such demand control system, for example, the inverter-stacker only operates when slugs reach the inverter-stacker and are available for stacking. Similarly, the cutter only operates when slugs are presented in the cutter. Thus, if a particular slug is removed from the off-bearing belt 10 in accordance with the present invention it will not adversely affect the operation of the setting machine except to the extent the operations of the setting machine will be delayed by the time required to deliver a subsequent slug.

Figure 1:
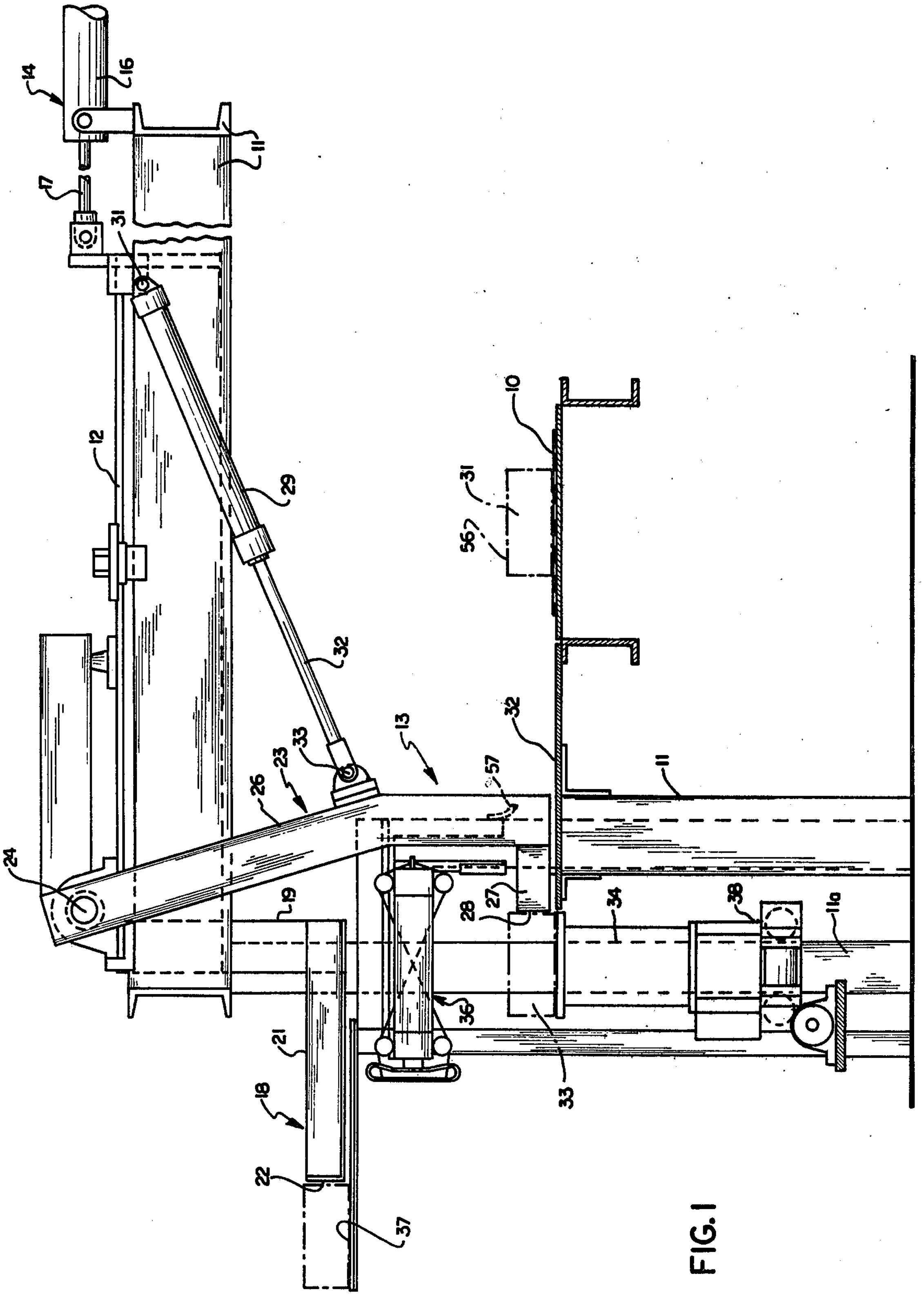
FIG. 1 is a side elevation illustrating a preferred machine incorporating the present invention.

The preferred form of this invention includes a support frame 11 adjacent to the off-bearing belt 10. Mounted on a support frame 11 is a reciprocating carriage 12 of a pusher assembly 13. The carriage is reciprocated forward and backward by a piston cylinder actuator 14 having a cylinder 16 mounted on frame portion 11 and a piston rod 17 connected to the carriage 12. In FIG. 1 the carriage is illustrated in its forward or extended position.

Mounted on the forward end of the carriage 12 is an upper pusher 18 which is supported from the carriage by depending legs 19 and provides a horizontally extending portion 21 supporting the pusher face 22. A lower pusher assembly 23 is pivotally mounted at 24 on the carriage 12 and includes spaced, downwardly extending arms 26 which extend in the position of FIG. 1 to a horizontal plane immediately above the off-bearing belt 10. Mounted on the lower end of the arms 26 are horizontal projections 27 providing a lower pusher face 28 at the forward end thereof.

Piston and cylinder actuators are provided to extend and retract the lower pusher assembly 23. Each actuator includes a cylinder 29 pivoted on the carriage 12 at 31 and a piston 32 pivoted at 33 on the arms 26. When the actuator pistons 32 are extended, the lower pusher assembly 23 is in the operative position in which the face 28 is immediately above the plane of the off-bearing belt 10. However, when the piston 32 is retracted, the lower pusher assembly 23 pivots up in an anticlockwise direction around the pivot 24 so that the pusher face 28 is located well above the off-bearing belt 10 and so that the pusher carriage 12 can be retracted without possible contact between the lower pusher and a slug 31 on the off-bearing belt 10. The slug has the cross section of a brick and is formed by an extruder as illustrated in the Pearne et al. patent, supra.

Adjacent to the off-bearing belt 10 is a platform 32 across which a slug is pushed by the pusher (as described in more detail below) to a cutting position where the slug at 33 rests on an elevator 34. Mounted above the elevator 34 is a cutter box or cutter frame assembly 36 provided with cutting means which cut the slug 33 as it is raised by the elevator 34 to a position in alignment with a discharge platform 37.

Figure 2:
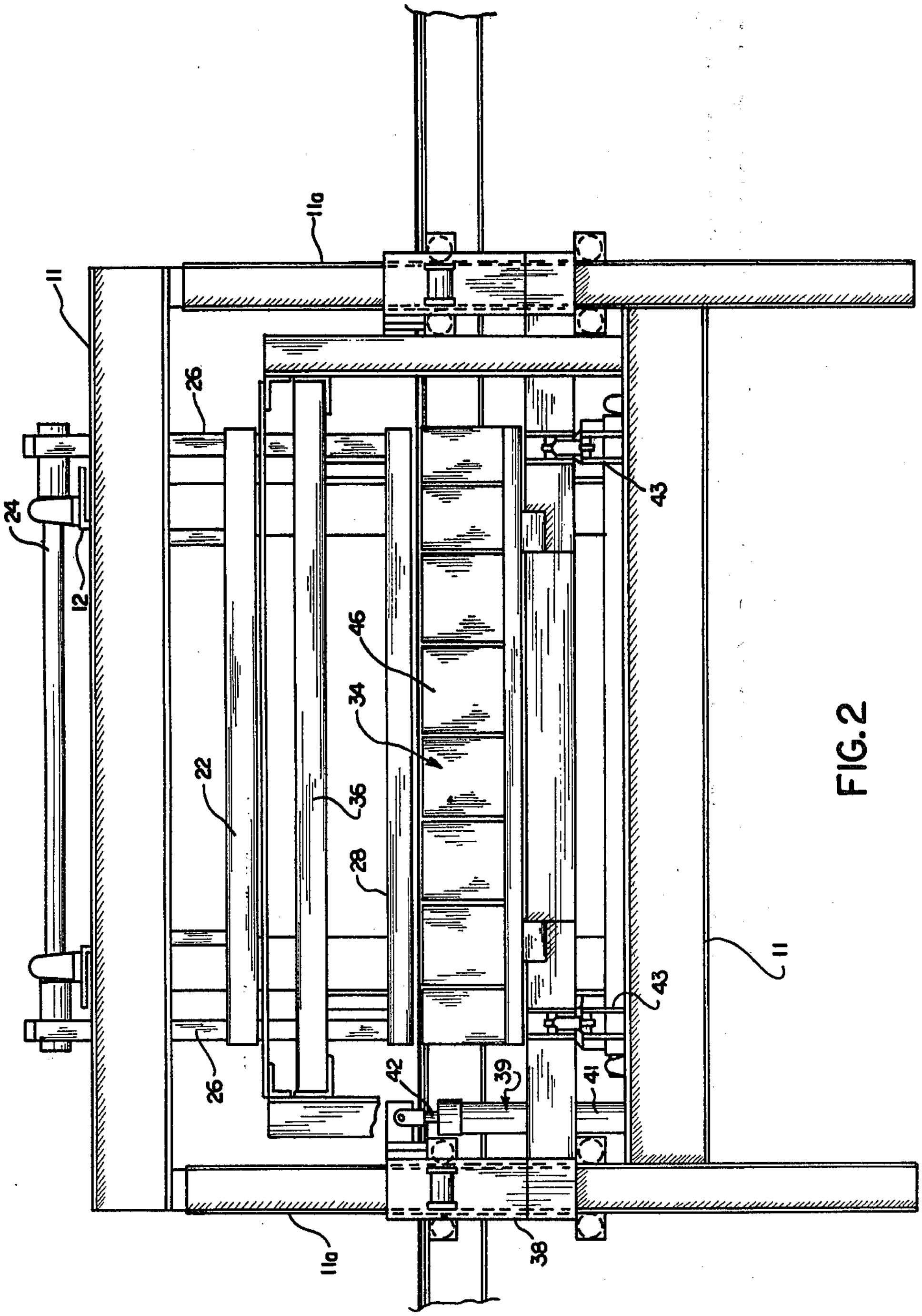
FIG. 2 is a vertical elevation taken generally parallel to the off-bearing belt, illustrating the machine of FIG. 1.

The elevator 34 includes a vertically reciprocable carriage 38 guided for vertical movement on frame members 11*a*. Referring to FIG. 2, the carriage 38 is powered for vertical movement by a pair of piston and cylinder actuators 39, only one of which appears in FIG. 2. The other actuator is located in the other end of the carriage. Each such actuator includes a cylinder 41 supported on the frame 11 and a piston 42 connected to the carriage 33. Suitable means such as torque arms 43 are provided to ensure that the elevator 34 moves up and down in a horizontally disposed position.

The elevator 34 is provided with a plurality of upstanding support platforms 46 which are spaced from each other and are sized and positioned to allow vertical movement up past cutter wires 47 mounted on the cutter frame 36. In the illustrated embodiment the cutter frame 36 is arranged to cut corner brick. However, it should be understood that cutter frames arranged to cut other special brick shapes, such as arch brick and the like, can also be used in the present machine with equal facility and that the machine incorporating the present invention is not limited to an apparatus or method for producing corner brick per se.

Figure 3:
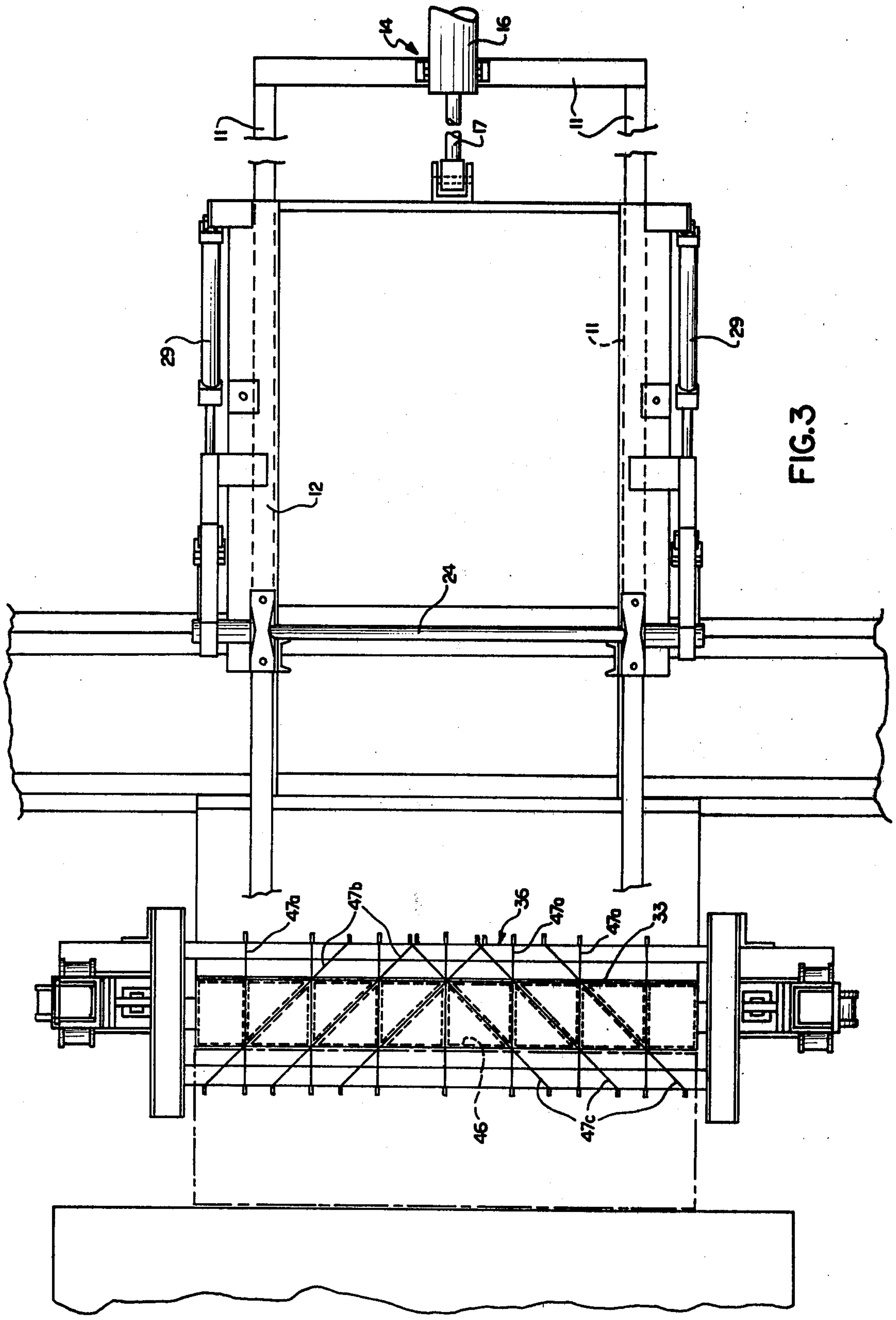
FIG. 3 is a plan view of the machine illustrated in FIGS. 1 and 2.
Figure 4:
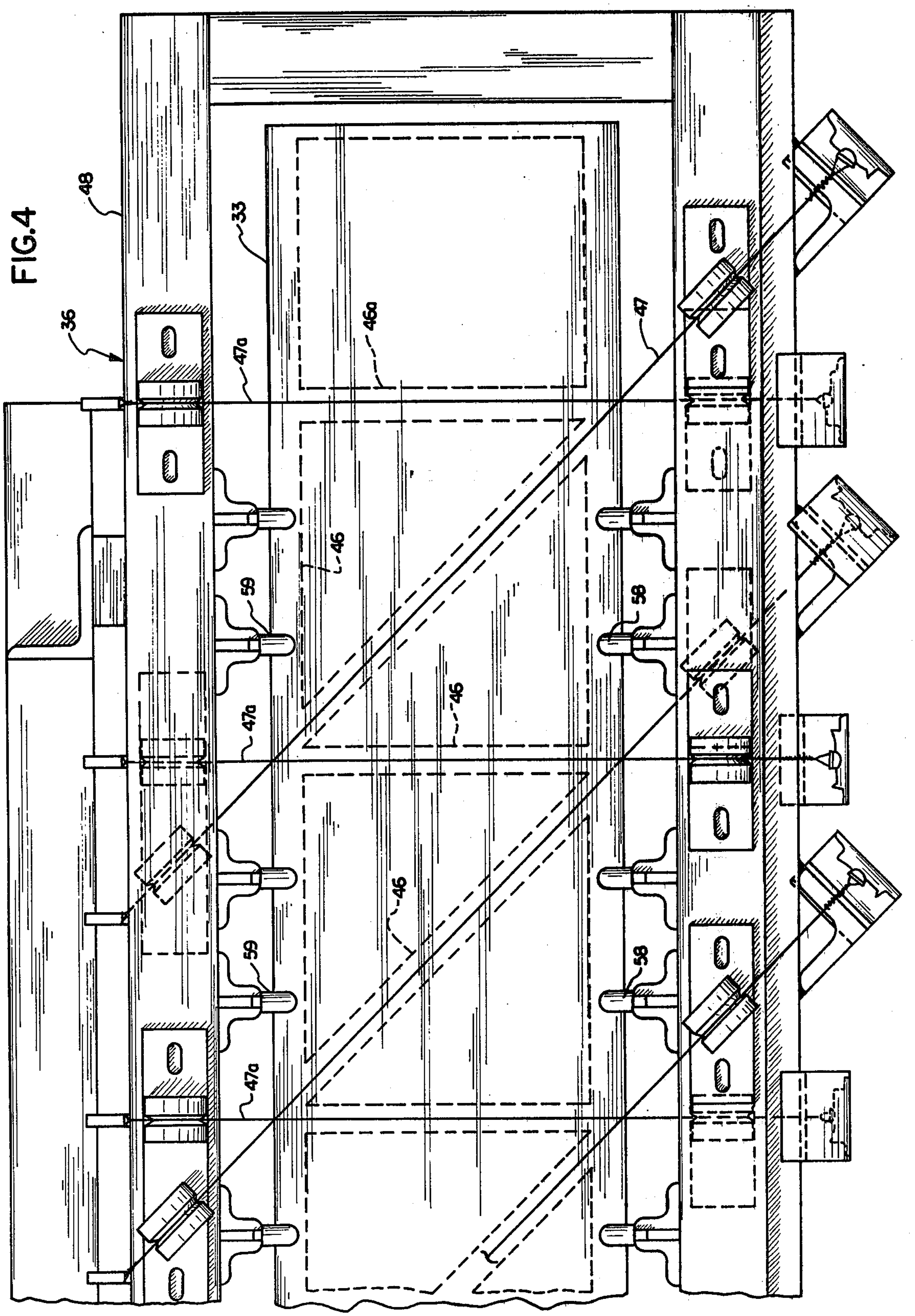
FIG. 4 is an enlarged fragmentary, plane view of a cutter frame for forming corner brick.
Figure 5:
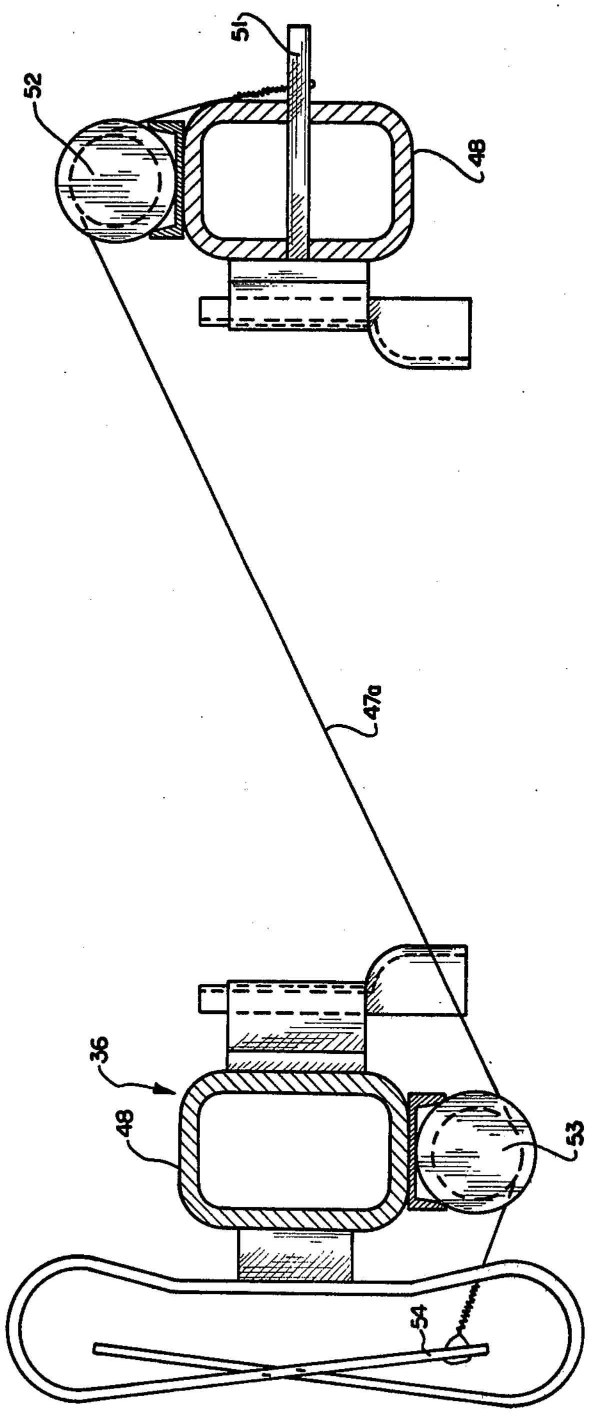
FIG. 5 is an enlarged, fragmentary cross section, illustrating the mounting of one of the cutter wires and the grooving tools on the cutter frame; and FIGS. *6a* through *6c* schematically illustrate the progressive steps in the operation of the machine through one cycle of operation.

Referring to FIGS. 4 and 5, the cutter frame or box 36 includes a rectangular frame or support system on which cutter wires 47 are mounted. Such wires are mounted on the frame with the first array 47*a* extending perpendicularly across the frame and second and third arrays 47*b* and 47*c* extending diagonally across the frame as best illustrated in FIGS. 3 and 4. As best illustrated in FIG. 5, one end of each wire anchored on a pin 51 extends over a roller guide 52, around a second roller guide 53 and has its other end anchored on a spring 54 which maintains the wire under tension. Each wire is therefore resiliently tensioned by its own spring.

Referring to FIG. 4, the upward projecting portions 46 of the elevator are spaced from each other and are shaped to extend up between the wires when the elevator is raised. For corner brick, the center projections are triangular in cross section and the projections at the ends of the elevator 46*a* may be rectangular since they do not extend up between wires during the raising movement but merely support the scrap ends of the slug 33. When other shapes are being produced, appropriate changes must be made in the location of wires and in the shape of the elevator platforms or projections 46. Corresponding cutter boxes and elevator platforms are provided and the machine is arranged so that they can be easily replaced when a machine changeover is required.

Texturing, grooving and/or edge rolling can be performed on three surfaces of the slug in accordance with the present invention. For example, grooving of the upper face 56 of the slug is provided by cutters or grooving tools 57 mounted above the intermediate platform 23 and positioned so that as a slug 31 is pushed from the position on the off-bearing belt 10 to the position on the elevator 34 at 33, suitable grooves or other texturing is provided on the upper face 56. Similarly, cutters or texturing tools 58 and 59 are mounted on opposite sides of the frame 48 which operate to cut mortar grooves and the opposite sides of the slug 31 as the slug is raised up through the cutter box 36 by the elevator 34. Generally, mortar grooves are cut relatively deep into the slug so that when the brick is installed the mason may insert a small amount of mortar in the groove and give the appearance that the corner brick are separate elements connected by mortar even through the bricks are triangular pieces, essentially three brick wide. Generally when mortar grooves are formed in the side edges of the slug, similar mortar grooves are formed in the top face which intersect at their ends with the edge grooves.

Figure 6A:
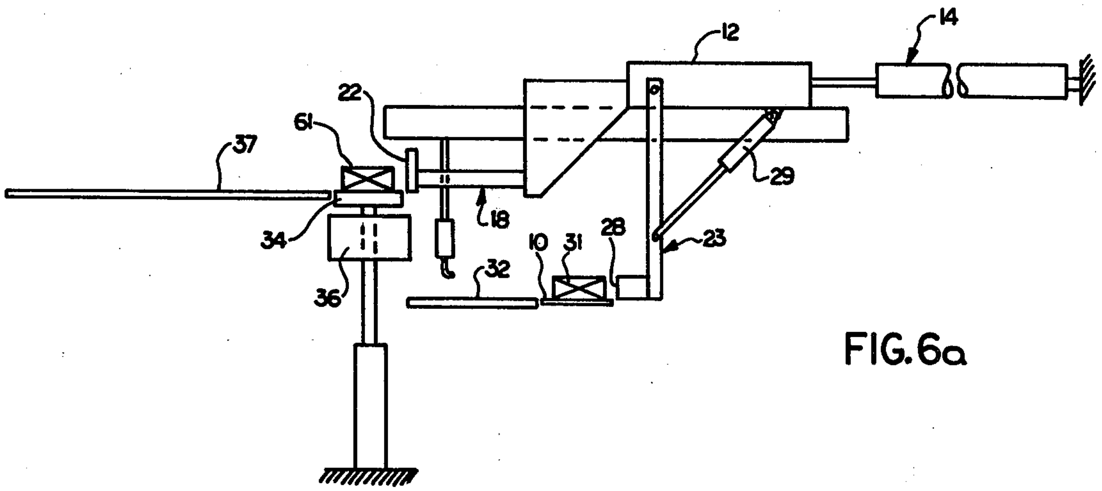
Figure 6B:
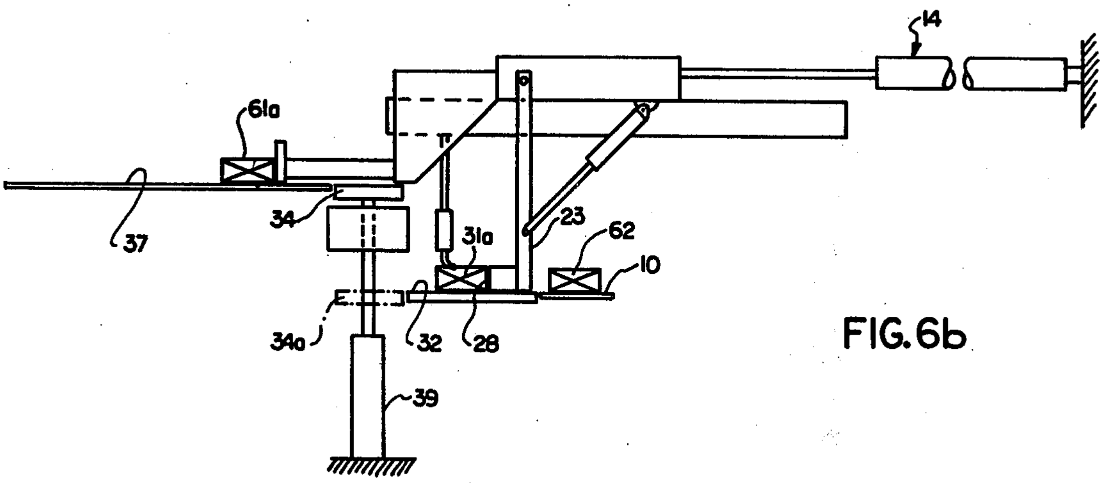
Figure 6C:
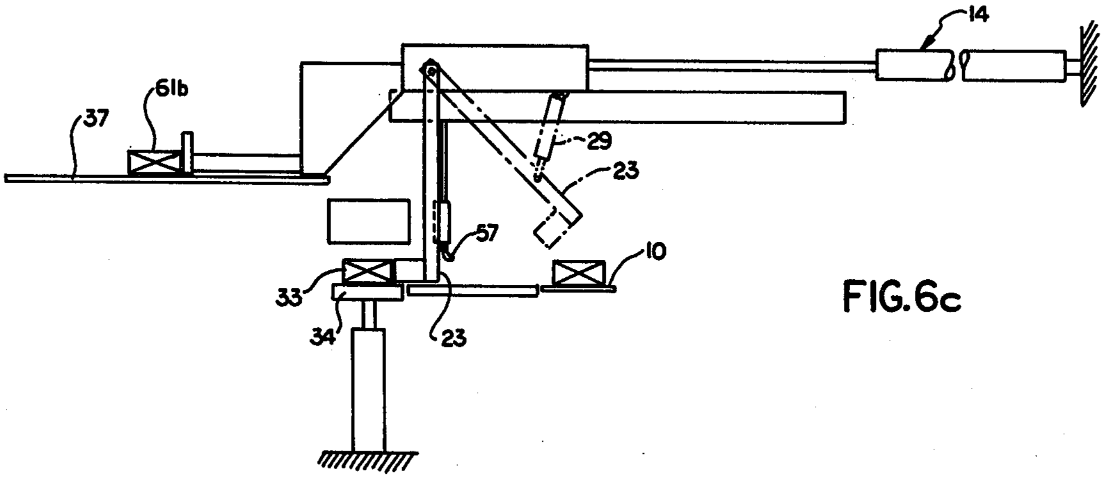

The sequence of operations of the apparatus is best illustrated in FIGS. 6*a* through 6*c*. Such figures schematically represent the operation of the apparatus. Initially as illustrated in FIG. 6*a*, the carriage 12 is retracted and the lower pusher assembly 23 is extended so that its pusher face 28 is adjacent to the right side of the off-bearing belt 10. At this point in the cycle, the elevator 34 is in the raised position, in which its upper surface is in alignment with the platform 37. In such condition the face 22 of the upper pusher assembly 18 is to the right of a cut slug 61 resting on the elevator 34 above the cutter box 36.

When the slug 31 is carried by the off-bearing belt 10 to a proper position for engagement by the pusher face 28, as determined, for example, by a photoelectric cell or other suitable sensor, the actuator 14 is operated to extend the pusher carriage 12 and the lower pusher face 28 engages the right side of the slug 31 (as viewed in FIG. 6A) and pushes the slug off the off-bearing belt onto the intermediate platform 32 to the position illustrated in FIG. 6*b*. In such position, the slug formerly in the position 31 is now in the position 31*a* on the platform 32.

The same movement of the carriage causes the cut slug 61 to be engaged by the pusher face 22 and push from the elevator 34 onto the platform 37 to the position 61*a* as illustrated in FIG. 6*b*. Once the carriage has moved forward to the position of FIG. 6*b*, the pusher 23 is clear of the off-bearing belt and subsequent slugs are free to move down the off-bearing belt to the setting machine in the usual manner. One such slug, for example, is indicated as slug 62 in FIG. 6*b*.

The machine is programmed to stop the extension of the actuator 14 when the intermediate position of FIG. 6*b* is reached and, while the pusher system remains in that intermediate position, the elevator 34 is lowered by its actuators 39 to the dotted line position at 34*a*, in which it is in alignment with the intermediate platform 32. After the elevator reaches this lowered position in which it can receive the slug 31*a*, the actuator 14 again extends until the slug is carried by the lower pusher assembly 23 to its cutting position at 33 where it rests on the elevator 34. As illustrated in FIG. 6*c*, this continued movement also carries the cut slug 61 to the position 61*b* along the platform 37 where it is removed from the machine by any suitable means. While the slug is moved from the off-bearing belt to the cutting position in 33 the upper surface of the slug is cut or textured by the cutting tool 57 as required. If texturing is required, texturing rolls (not illustrated) are positioned to engage the slug as it is moved to the cutting position. Similarly, if edge rolling is required, suitable edge rolling tools are installed.

After the machine reaches the position in FIG. 6*c*, the actuators 29 retract to raise the lower pusher assembly to the phantom position of FIG. 6*c* in which it is clear of slugs being carried down the off-bearing belt. Once the lower pusher assembly is raised clear of the off-bearing belt, the actuator 14 is retracted to carry the pusher assembly back to the retracted position of FIG. 6*a* and the actuators 29 are extended to complete the cycle of pusher operation. The elevator is then raised to push the slug up through the cutter box 36 and to a position in alignment with the discharge platform 37. As the slug passes through the box, it is cut into the required shaped brick by the wires and the opposite side surfaces are grooved or otherwise treated. With this operation, the machine has completed an entire cycle and is again in the condition of FIG. 6*a*, ready to repeat its operation.

With the present machine, full automatic operation can be provided or the machine can be arranged to deliver one completed cut slug to the platform 37 for removal and then automatically operated to produce a subsequent cut slug. Further, changeover of the machine from one special brick form to another is easily accomplished by an appropriate change of the cutter box 34 and related changes of the projecting elevator portions 36 to correspond to the new cutter box pattern.

Similarly, grooving tools may be removed or replaced as required. Because the machine can be automatically fed from a conventional setting machine without interrupting the operation of the setting machine, it is possible for the operator of the setting machine to produce required special brick shapes which still monitoring the overall operation of the setting machine.

Although the preferred embodiment of this invention has been shown and described, it should be understood that various modifications and rearrangements of the parts may be resorted to without departing from the scope of the invention as disclosed and claimed herein.

What is claimed is:

1. An apparatus for producing special brick shapes comprising conveyor means along which elongated slugs of green clay having an upper finish face and side edges are carried to a setting machine, a cutter frame adjacent to said conveyor means operable to cut slugs into special brick shapes, a pusher operable to push selected slugs off of said conveyor means to a location under said cutter frame, an elevator vertically movable between a first position below said frame in which slugs are positioned thereon by said pusher to an upper position above said frame to cause said cutter frame to cut said slugs into a plurality of shaped brick like articles, said pusher thereafter moving said articles from said elevator while said elevator remains in said second position.

2. An apparatus as set forth in claim 1, wherein said apparatus includes a first surface treatment means operating to shape said face of said slug as it is moved by said pusher to said cutting location, and second surface treatment means are provided at the cutting location to shape at least one side edge of said slug.

3. An apparatus as set forth in claim 1, wherein first surface treatment means are located between said conveyor means and said elevator and operate to provide surface treatment of the upper surface of said slug as said slug is pushed thereby by said pusher, and second surface treatment means are located at said elevator and operate to provide surface treatment of at least one side edge of said slug as it is moved by said elevator.

4. An apparatus as set forth in claim 1 wherein said pusher includes a lower pusher portion operable to push a slug from said conveyor means to said cutting location and an upper pusher portion operable to push a cut slug from said elevator at said upper location.

5. A special brick forming machine comprising a cutter frame, power means operable to move an elongated slug laterally to a position below said cutter frame, elevator means operable to move said slug vertically through said cutter frame to cut said slug into a plurality of specially shaped bricks, said power means thereafter moving the cut slug from said elevator, said power means including a reciprocating carriage, first pusher means on said carriage operable to push slugs onto said elevator means at one level, and second pusher means on said carriage operable to push a slug off said elevator at a second level vertically spaced from said first level, both of said pusher means operating to push said slugs in response to movement of said carriage.

6. A special brick forming machine comprising a cutter, an elevator operable in a first position to receive an elongated slug in a position below said cutter and to lift said slug vertically up through said cutter to a second position above said cutter, said cutter operating to cut said slug into brick like articles during movement of said elevator from said first position to said second position, and a horizontally reciprocable pusher operable through repeated cycles, said pusher having a first pusher face engageable with a slug at a lower level operable to push a slug onto to said elevator when said elevator is in said first position and a second pusher face engageable with a slug at an upper level operable to push a slug off of said elevator while said elevator is in said second position, said pusher and elevator operating through repeated cycles so that said pusher during a first portion of its cycle and while said elevator is in said second position causes said second pusher face to move a cut slug from said elevator, said elevator thereafter moving without a slug thereon from said second position to said first position, and said pusher thereafter while said elevator is in said first position moving through a second portion of its cycle causing said first pusher to move a subsequent slug on to said elevator.

7. An apparatus as set forth in claim 6 wherein said pusher is movable horizontally between first extreme position and a second extreme position, said first portion of said cycle occurring while said pusher moves from said first extreme position to an intermediate position and said second portion occurring while said pusher continues in the same direction from said intermediate position to said second extreme position.

* * * * *